Nov. 8, 1938.  D. COLLINS  2,136,276
AUXILIARY CONTROL FOR HYDRAULIC BRAKES
Filed March 20, 1936  2 Sheets-Sheet 1
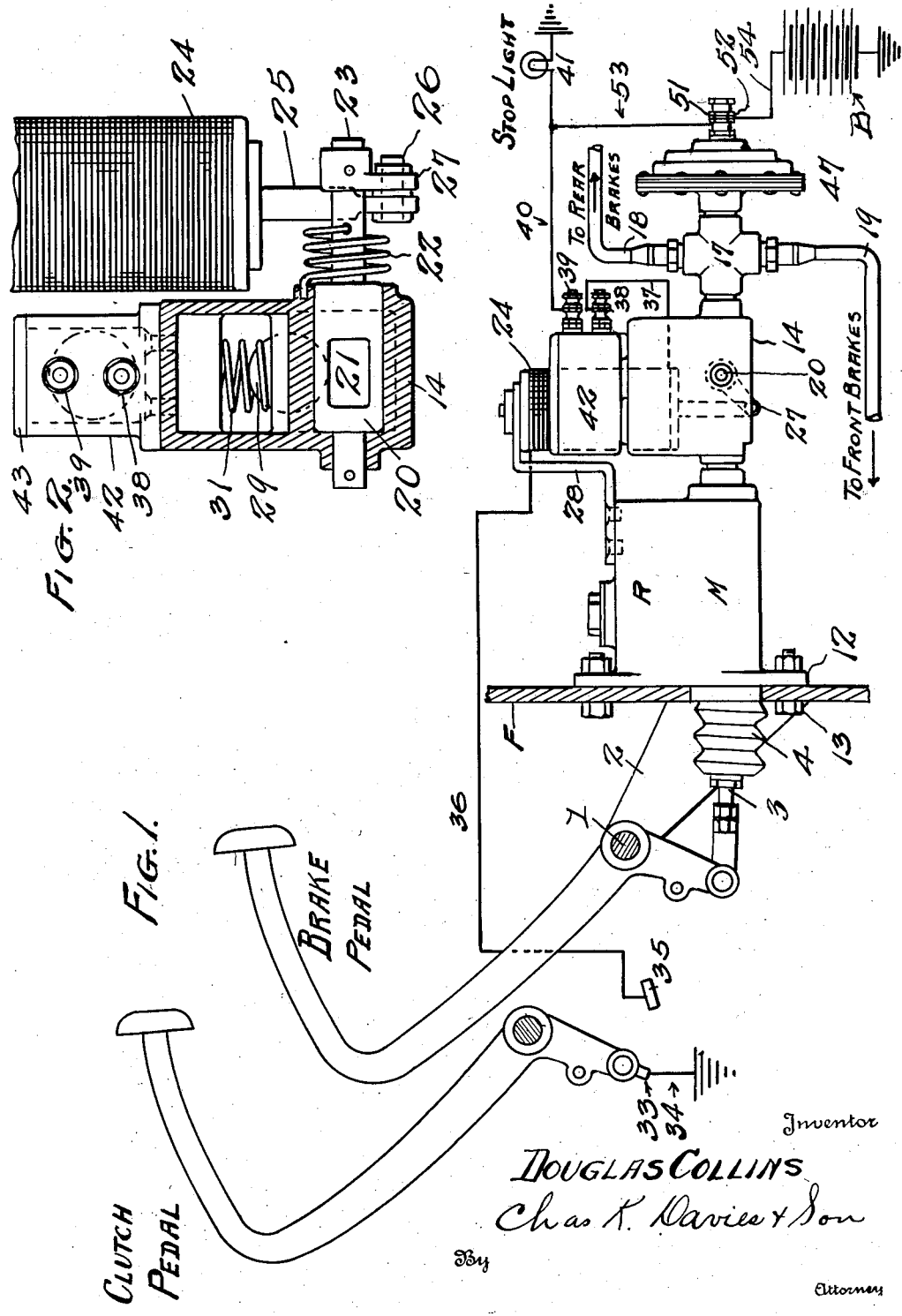
Inventor
Douglas Collins
Chas. K. Davies & Son
By
Attorney

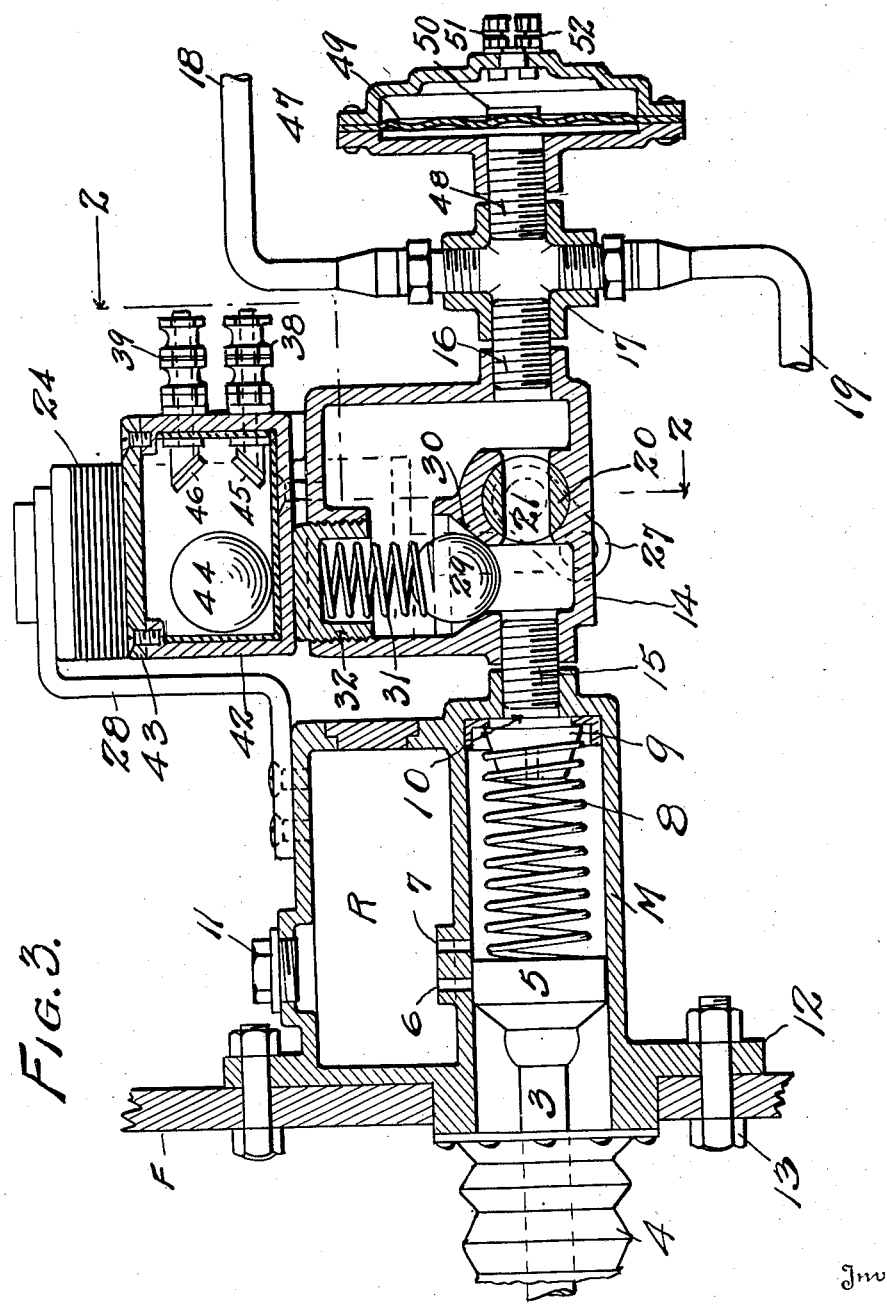

Patented Nov. 8, 1938

2,136,276

UNITED STATES PATENT OFFICE 2,136,276

AUXILIARY CONTROL FOR HYDRAULIC BRAKES

Douglas Collins, Salisbury, N. C.

Application March 20, 1936, Serial No. 69,936

3 Claims. (Cl. 192—13)

My present invention relates to an improved auxiliary control for hydraulic brakes designed especially for the purpose of maintaining the brakes in applied position, after the brakes have been manually applied through the use of the motive fluid pressure of the hydraulic braking system of an automotive vehicle. The mechanism of the auxiliary control performs the functions of a "hill-holder" for automotive vehicles, which operates to maintain the brakes applied as long as the clutch of the driving mechanism of the vehicle is disengaged (or out) and the vehicle is pointed upgrade on a highway, street, or other incline.

In carrying out my invention I combine my auxiliary control mechanism with a standard type of hydraulic braking mechanism, which is usually pedal operated, and the mechanism involves the use of the customary stop-light or red signal light which is illuminated when the hydraulic brakes are applied. I also utilize the clutch-pedal of the vehicle driving-mechanism as a circuit maker or control switch, which is closed when the clutch is disengaged, and open when the clutch is "in" or engaged. While my auxiliary control mechanism is installed for co-operation with these essential features or accessories of the vehicle, it will be understood that these accessories are capable of performing their usual functions in customary manner without benefit of the auxiliary control mechanism, when desirable and necessary.

By the use of the auxiliary control mechanism, the hydraulic braking system is rendered more efficient and flexible in the application and maintenance of the brakes, and the driver of the automobile is relieved of the necessity for constant and continuous use of his foot in connection with the brake pedal, thereby enabling him to use his foot for other duties in the control of the automobile.

In the embodiment of my invention I utilize a spring-opened control valve in the hydraulic braking system, between the master cylinder and the brake cylinders, which valve is closed through the operation of an electro-magnet or solenoid, located in a control circuit having a control switch on the clutch pedal; and a gravity actuated switch, operated only when the automobile is pointed up-grade, is also empolyed in the control circuit for the auxiliary valve. In addition, I utilize a pressure actuated, hydraulic, circuit closer in the stop-light circuit, for control of the stop light or rear signal used in connection with the hydraulic braking system. A safety valve is also provided in the auxiliary mechanism for rendering the braking system at all times reliable and dependable and free from accidental impairments.

My invention consists in certain novel features of construction, and combinations and arrangements of parts, as will hereinafter be more fully set forth and claimed. In the accompanying drawings I have illustrated one complete example of the physical embodiment of my invention wherein the parts are combined and arranged according to one mode I have thus far devised for the practical application of the principles of my invention, but it will be understood that changes and alterations may be made in these exemplifying structures, within the scope of my appended claims, without departing from the principles of my invention.

Figure 1 is an assembly view, showing the braking mechanism, with the brakes released, the clutch pedal in engaged position with the clutch "in", and the equipment required in the installation of my auxiliary control mechanism for the braking system.

Figure 2 is an enlarged detail cross sectional view of the auxiliary valve-casing, showing the valve of the auxiliary mechanism, as indicated at line 2—2 of Figure 3, and showing also the solenoid or electro-magnet for closing the valve, and in addition an exterior end view of the casing for the gravity actuated switch or circuit maker is shown.

Figure 3 is a longitudinal, vertical, sectional view, with parts in elevation, of the braking system equipped with the auxiliary mechanism of my invention, showing the position of parts when the brakes are released.

In Figures 1 and 3 I have indicated at F a suitable stationary supporting frame, which may be located at any desired point convenient to the clutch pedal and the brake pedal, upon which the hydraulic braking mechanism is supported, and the auxiliary control mechanism is combined with and rigidly supported on the braking mechanism. The standard type of hydraulic braking mechanism includes a master cylinder M and its reservoir R, and the brake pedal which operates the braking system is pivoted at 1 on a bracket 2 of the frame F. The push rod 3 from the brake pedal passes through a boot 4 to the interior of the master cylinder M and is flexibly connected with the piston 5 that reciprocates in the master cylinder, past the breather port 6 and the compensating port 7, which provide communication between the reservoir and the master cylinder. When the brake pedal is depressed, to apply the brakes, the piston is moved to the right in Figure 3 against the tension of the return spring 8, and the oil or motive fluid is forced through a valve 9 and discharged from the master cylinder through its port 10.

The reservoir R is provided with a filler-cap 11, and the integral reservoir and cylinder M are flanged at 12 and bolted at 13 to the frame F.

In combination with the master cylinder I utilize an auxiliary valve-casing 14, which is connected by nipple 15 at the ported end (10) of the master cylinder, and at the rear end of the valve casing a second nipple, 16, is alined with the first nipple 15. A four-way connection 17 is threaded on the nipple 16, and two main brake pipes 18 and 19 extend from this connection, the former pipe to the rear brake-cylinder, and the latter to the front brake-cylinder, which cylinders are not shown.

The auxiliary control valve 20 is of the rotary plug type which extends transversely through the valve casing and is journaled to oscillate in bearings in the walls of the casing. The control valve is located between the two alined nipples 15 and 16, and a port 21 in the valve affords communication between front and rear parts of the casing, in order that the hydraulic pressure may be applied in a direct line, when the brake pedal is depressed, from the master cylinder through the valve casing to the connection, and thence the pressure is applied through the brake pipes 18 and 19 as usual.

For the usual braking operations, the valve 20 is held with its port 21 open in suitable manner, as by a spring 22 coiled about the reduced shank or stem 23 of the valve, with one end fixed to the stationary valve casing and the other end anchored to the valve stem, in such manner that the spring will return the valve to open position and hold it there, unless the auxiliary control mechanism operates to close the control valve.

The valve is turned to closed position to interrupt direct communication between the master cylinder and the brake pipes 18 and 19, through the operation of an electro-magnet or solenoid 24 having a core 25, which is pivoted at 26 to the crank arm 27 rigidly mounted on the shank or stem 23 of the valve. The electro-magnet is rigidly supported in suitable manner, as by a bracket 28 which is rigidly mounted on the reservoir R, and when energized the magnet pulls the core or stem 25 to swing the crank arm and turn the valve with its port 21 in closed position. When the electro-magnet is de-energized, the return spring 22 turns the valve 20 in its journal bearings to open position of the port as in Figure 3.

As a safety device, to insure communication in one direction at all times, between the master cylinder and the brake pipes, regardless of the position of the control valve 20, I employ an automatic ball valve 29 having a seat 30 above the line of direct pressure through the valve casing. This valve may open under braking pressure of the motive fluid, but it is automatically closed by back pressure that might occur around the closed control valve 20, and the check valve is held in its seat in closed position by a spring 31 which is interposed between the ball valve and a hollow, adjustable screw plug 32 threaded in a complementary opening in the top wall of the valve casing 14. If, through accident, or otherwise, the control valve 20 is in closed position when the brake pedal is depressed, the hydraulic pressure is applied under the valve 29, which is lifted from its seat, against tension of spring 31, to permit flow of oil under pressure around the closed valve 20 to the nipple 16, and thence to the brake pipes 18 and 19.

As indicated in Figure 1, electric current from the battery B to the electro-magnet 24 is controlled by the position of the clutch pedal, which is provided with a movable contact 33 connected by wire 34 to a grounded terminal. A stationary contact 35, together with the movable contact 33, forms the control switch, which switch is connected with the electro-magnet by way of wire 36. As indicated in Figure 1 this switch is open when the clutch pedal is in engaged position, i. e. when the clutch is "in"; but the switch is closed when the pedal is depressed, as usual, to open or disengage the clutch, i. e. when the clutch is "out".

Another wire 37 of the electro-magnetic control circuit, is connected to a terminal 38, and from a complementary terminal 39, a wire 40 is extended to the stop-light, or rear red signal lamp 41, which lamp is grounded as indicated. The two terminals 38 and 39 are mounted exterior of a valve casing or housing 42, which housing is rigidly fixed in convenient position on top of the control valve-casing 14, and the housing is provided with a removable cover 43 affording access to the interior thereof.

Within the housing, as best seen in Figure 3, is confined a ball or sphere 44, of good conducting material or metal, and the ball performs the functions of a gravity-actuated circuit maker cooperating with two stationary contact points 45 and 46 mounted in a wall of the housing and connected with wires 37 and 40 through the terminals 38 and 39. When the automobile is pointed up-hill or up-grade, this conductor or circuit closer 44 is adapted to roll, by gravity, into frictional and electrical contact with the two stationary contacts 45 and 46, to close the electro-magnetic control circuit. When closed, this circuit extends from battery B through wire 54 to and through a pressure controlled switch 50—51—52, thence through wires 53 and 40 to the gravity controlled switch 44—45—46, and by wire 37 to the electro-magnet 24, thence by wire 36 to the control switch 33—35, and wire 34 to the ground, the circuit being completed through the ground to the battery B.

The stop light 41, which is illuminated when the brakes are applied, has a circuit which is controlled by the pressure operated switch 50—51—52, and it will be understood that the hydraulic pressure which is available when the brakes are applied, is used to close this switch. For this purpose a housing 47 is attached by a nipple 48 to the rear end of the four-way connection 17, in order that the hydraulic pressure, when applied, may extend through the nipple into the housing and against a diaphragm 49.

A movable contact 50 is mounted on the diaphragm 49, which, under hydraulic pressure against the diaphragm, moves into contact with the two stationary contacts 51 and 52 mounted on the housing and having exterior terminals. From the terminal 51 a wire 53 extends to and is connected with the wire 40, and from the terminal 52 a wire 54 extends to and is connected with battery B, which is grounded as indicated in Figure 1.

From the above description taken in connection with my drawings, it will be apparent that the clutch pedal, and the brake pedal, as usual, may be operated for the performance of their customary functions in the control and operation of an automobile.

The auxiliary control mechanism of my invention, while adapted for use in various ways, is especially useful to the driver of an automobile, in starting, after he has been compelled to stop on an up-grade, as for instance, at a red traffic signal. Under such conditions, after the brakes have been applied by depression of the brake pedal, the clutch pedal is also depressed, as is the usual custom, to disengage or throw "out" the clutch. This depression of the clutch pedal I utilize to operate the auxiliary valve to closed position, and thereby retain the hydraulic pressure in the brake-pipes and brake cylinders, thus enabling the driver to remove his foot from the brake pedal, while retaining his other foot on the clutch pedal as he awaits the green or "go" signal. When the green signal appears, instead of being compelled to manipulate both the brake pedal and the clutch pedal, to oppose the brakes to the clutch, or vice versa, as is customary in starting up a hill, the driver merely releases the clutch pedal to engage the clutch, and the brakes are simultaneously and automatically released, through the auxiliary control mechanism. When the automobile is pointed up-hill, thus closing the gravity-actuated switch of the electro-magnetic circuit, and after the brakes have been applied by depression of the brake pedal, the control valve 20 may be closed as the clutch is thrown "out", and thereafter the control valve remains closed as long as the clutch is "out" or disengaged. The clutch is, of course, automatically engaged, when the clutch pedal is released.

Having thus fully described my invention, what I claim as new and desire to secure by Letters Patent is:—

1. In a brake holding mechanism for hydraulic vehicle-brakes employed with means for applying the brakes, and a clutch pedal; the combination of a fluid pressure control valve and valve-closing means, an electro-magnet for operating said means, a control circuit including a source of electric current and also including the electro-magnet, a gravity-closed circuit-maker in the control circuit operative only when the vehicle is on an incline, a switch in the control circuit which is closed when the clutch pedal is moved to disengage a clutch, a stop-light circuit and a stop light therein connected with the control circuit, and a fluid pressure operated circuit maker in the stop-light circuit.

2. A brake holding mechanism for use with a fluid pressure braking system including a master cylinder, a valve device, and a fluid pressure operated circuit maker; a normally open valve in said device, valve-closing means and an electro-magnet for operating said means, a control circuit including a source of electric current and also including said electro-magnet, a clutch pedal, a switch in the control circuit adapted to be closed by movement of the clutch pedal to clutch-disengaged position, a stop-light circuit including the circuit maker, and a stop-light in its circuit connected with the control circuit.

3. In a brake holding mechanism for hydraulic vehicle-brakes employed with means for applying the brakes, and a clutch pedal; the combination of a fluid pressure control valve and valve-closing means, an electro-magnet for operating said means, a control circuit including a source of electric current and also including the electro-magnet, a gravity-closed circuit maker in the control circuit operative only when the vehicle is on an incline, and a switch in the control circuit which is closed when the clutch pedal is moved to disengage a clutch.

DOUGLAS COLLINS.